US012130578B2

(12) United States Patent
Mizuno et al.

(10) Patent No.: US 12,130,578 B2
(45) Date of Patent: Oct. 29, 2024

(54) IMAGE FORMING APPARATUS

(71) Applicant: KYOCERA Document Solutions Inc., Osaka (JP)

(72) Inventors: Masahiko Mizuno, Osaka (JP); Kazuki Yoshioka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/472,828

(22) Filed: Sep. 22, 2023

(65) Prior Publication Data

US 2024/0111242 A1 Apr. 4, 2024

(30) Foreign Application Priority Data

Sep. 29, 2022 (JP) ................................ 2022-156480
May 30, 2023 (JP) ................................ 2023-089056

(51) Int. Cl.
*G03G 15/04* (2006.01)
*G03G 21/16* (2006.01)

(52) U.S. Cl.
CPC ..... *G03G 21/1647* (2013.01); *G03G 21/1676* (2013.01)

(58) Field of Classification Search
CPC ............. G03G 15/0813; G03G 15/757; G03G 21/1647; G03G 21/1671; G03G 21/1676; G03G 21/1857
See application file for complete search history.

(56) References Cited

U.S. PATENT DOCUMENTS 8,768,212 B2 * 7/2014 Hashimoto ........ G03G 15/0813 399/119
11,693,331 B2 * 7/2023 Wang ................ G03G 21/1671 399/262
2012/0163859 A1 6/2012 Hashimoto et al. .......... 399/111
2013/0136494 A1 * 5/2013 Itabashi ............ G03G 21/1814 399/113

FOREIGN PATENT DOCUMENTS

JP 2012-137556 A 7/2012

* cited by examiner

*Primary Examiner* — Hoang X Ngo
(74) *Attorney, Agent, or Firm* — Stein IP, LLC

(57) ABSTRACT

An image forming apparatus includes a drum unit, a developing unit, a developing roller bearing, a guide portion, and an urging portion. The drum unit includes a photosensitive drum. The developing unit includes a developing roller. The developing roller bearing supports the developing roller and can move radially and rotate axially with respect to the developing unit. The guide portion is formed in the drum unit and guides the developing roller bearing in directions toward and away from the photosensitive drum. The urging portion urges the developing unit in such a direction that it presses the developing roller against the photosensitive drum. The developing unit includes a restriction portion that restricts the rotation of the developing roller bearing with respect to the developing unit within a predetermined range.

6 Claims, 15 Drawing Sheets

IMAGE FORMING APPARATUS

INCORPORATION BY REFERENCE

This application is based on and claims the benefit of priority from Japanese Patent Application No. 2022-156480 filed on Sep. 29, 2022 and Japanese Patent Application No. 2023-089056 filed on May 30, 2023, the contents of which are hereby incorporated by reference.

BACKGROUND

The present disclosure relates to an image forming apparatus.

In electrophotographic image forming apparatuses, a method is known in which a developing roller is brought into contact with a photosensitive drum to feed a non-magnetic one-component developer to the photosensitive drum.

SUMMARY

According to one aspect of the present disclosure, an image forming apparatus includes a drum unit, a developing unit, a developing roller bearing, a guide portion, and an urging portion. The drum unit includes a photosensitive drum. The developing unit includes a developing roller. The developing roller bearing supports the developing roller and can move radially and rotate axially with respect to the developing unit. The guide portion is formed in the drum unit and guides the developing roller bearing in directions toward and away from the photosensitive drum. The urging portion urges the developing unit in such a direction that it presses the developing roller against the photosensitive drum. The developing unit includes a restriction portion that restricts the rotation of the developing roller bearing with respect to the developing unit within a predetermined range.

Other objects of the present disclosure and specific advantages resulting from the present disclosure will become clearer from the description of the embodiments described below.

DETAILED DESCRIPTION

A printer 1 (one example of an image forming apparatus) according to one embodiment of the present disclosure will be described below with reference to the drawings.

Before a description of the printer 1, problems with conventional technologies will be described. As already mentioned, in electrophotographic image forming apparatuses, a method is known in which a developing roller is brought into contact with a photosensitive drum to feed a non-magnetic one-component developer to the photosensitive drum. With this method, the contact region between the photosensitive drum and the developing roller is displaced due to tolerances in components. This leads to a problem of the pressing force between the photosensitive drum and the developing roller varying to produce shades in an image.

To cope with that, technologies for optimizing the pressing force between the photosensitive drum and the developing roller are being studied. As one example of conventional technologies, the following image forming apparatuses is known. Specifically, the image forming apparatus includes a photosensitive unit including a photosensitive drum, a developing unit having a developing roller and removably attachable to the photosensitive unit, a first pressing member, and a second pressing member. The first pressing member presses the developing unit to keep the developing roller in pressed contact with the photosensitive drum. The second pressing member makes contact with the photosensitive drum and presses the developing unit against the pressing force of the first pressing member with a pressing force weaker than the pressing force of the first pressing member.

Inconveniently, with the configuration of the image forming apparatus described above, the addition of the first and second pressing members incurs an increase in cost.

Under the circumstances discussed above, the present disclosure aims at providing an image forming apparatus that can suppress variation of the pressing force between a photosensitive drum and a developing roller without increasing the number of components.

Figure 1:
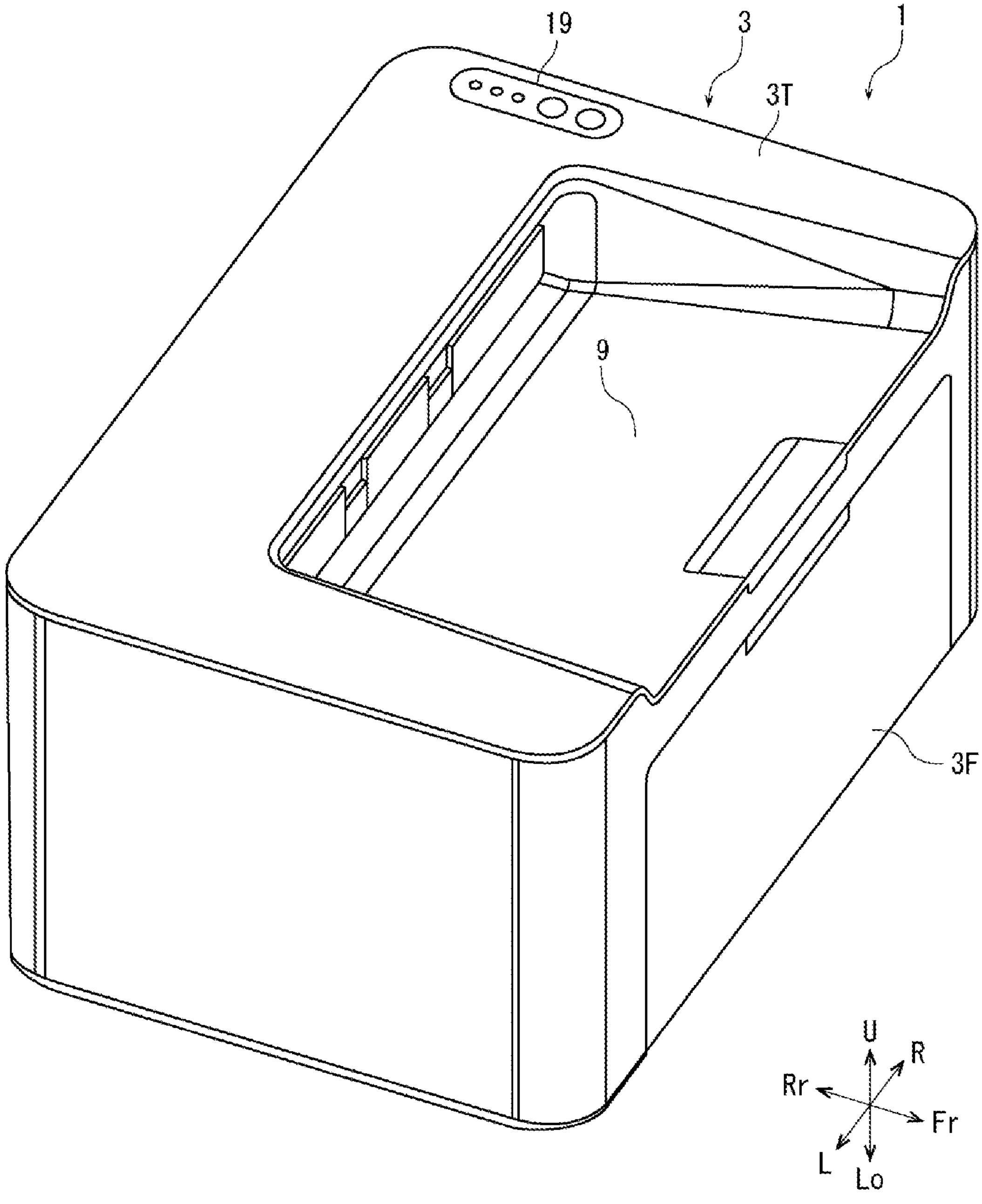
FIG. 1 is a perspective view showing the exterior appearance of a printer according to one embodiment of the present disclosure.
Figure 2:
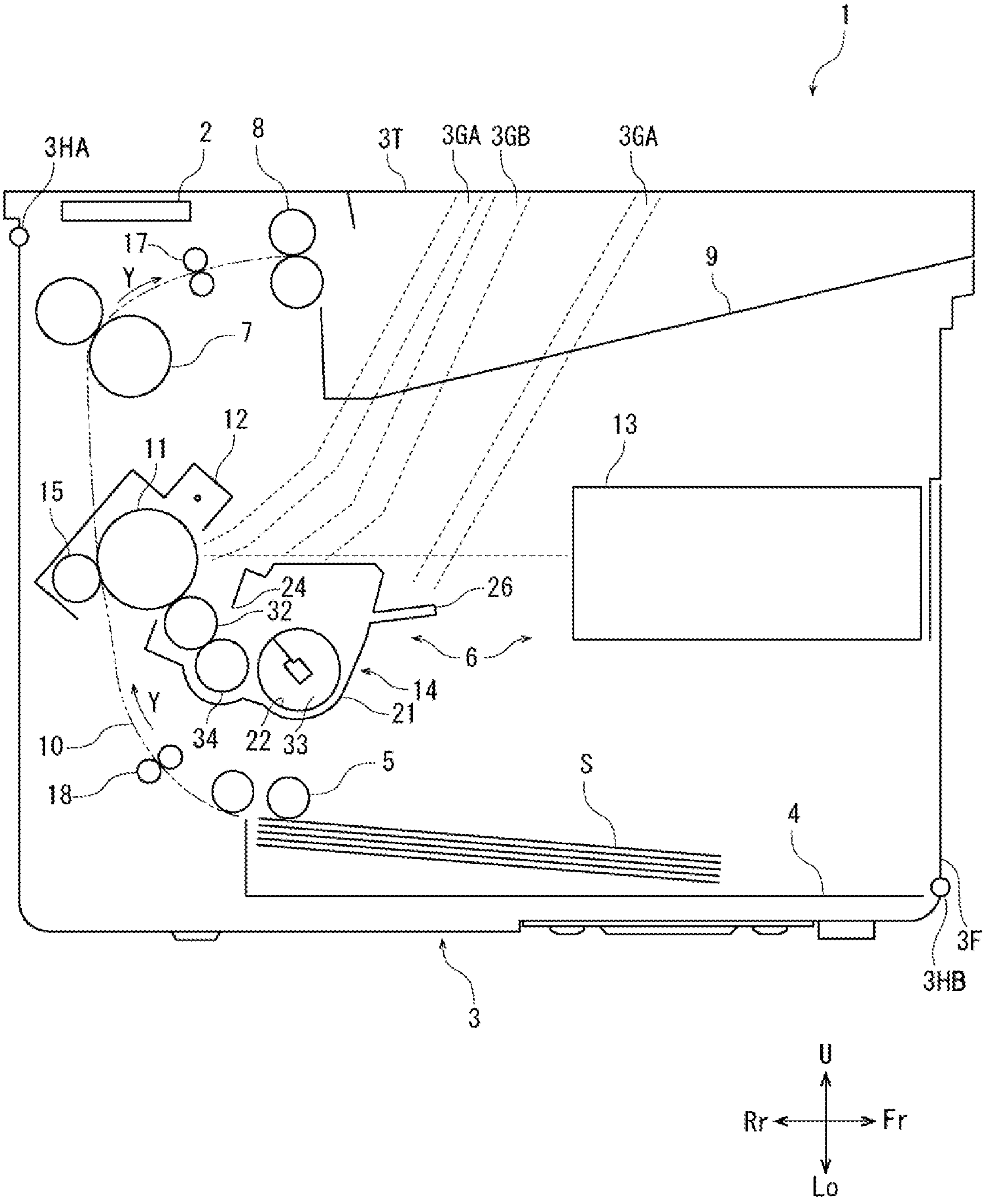
FIG. 2 is a left side view schematically showing the inner construction of the printer according to one embodiment of the present disclosure.

The overall configuration of the printer 1 will be described. FIG. 1 is a perspective view showing the exterior appearance of the printer 1. FIG. 2 is a left side view schematically showing the inner construction of the printer 1. The following description assumed that the side indicated Fr in FIGS. 1 and 2 is the front side of the printer 1 and that the left and right sides are defined relative to the printer 1 as it is viewed from the front. In each figure, U, Lo, L, R, Fr, and Rr represents up, down, left, right, front, and rear respectively.

The printer 1 includes a body housing 3 in the shape of a rectangular parallelepiped. In a lower part in the body housing 3, a sheet feed tray 4 for placing sheets S on and a sheet feed roller 5 for feeding out a sheet S from the sheet feed tray 4 are provided. Above the sheet feed tray 4, an image forming device 6 that forms a toner image by electrophotography is provided, and above the image forming device 6, a fixing device 7 that fixes the toner image to the sheet S is provided. In front of the fixing device 7, a discharge roller 8 that discharges the sheet S having the toner image fixed to it is provided.

In a top part of the body housing 3, a top opening (not illustrated) open upward is provided. A top plate 3T that closes the top opening can be opened and closed about a hinge 3HA provided at the rear end as a fulcrum. The top plate 3T is provided with a discharge tray 9 for placing the discharged sheet S on. In a front part of the body housing 3, a front opening (not illustrated) open frontward is provided. A front cover 3F that closes the front opening can be opened and closed about a hinge 3HB provided at the lower end as a fulcrum.

The image forming device 6 has a photosensitive drum 11 that changes its potential when exposed to light, a charging device 12 that electrostatically charges the photosensitive drum 11 by electric discharge, an exposure device 13 that emits laser light according to image data, a developing unit 14 that feeds toner to the photosensitive drum 11, and a transfer roller 15 that generates a transfer bias. The transfer roller 15 is arranged at the rear end, the photosensitive drum 11 is arranged in front of the transfer roller 15, the developing unit 14 is arranged in front of the photosensitive drum 11, and the exposure device 13 is arranged in front of the developing unit 14. In the body housing 3, a conveyance passage 10 is provided from the sheet feed roller 5 to the discharge roller 8 via the transfer roller 15 and the fixing device 7. In a section of the conveyance passage 10 between the sheet feed roller 5 and the transfer roller 15, a registration roller 18 is provided. A conveyance roller 17 is provided between the fixing device 7 and the discharge roller 8. The sheet S is conveyed along the conveyance passage 10 in the direction of arrow Y.

A control portion 2 includes an arithmetic portion (not illustrated) and a storage portion (not illustrated). The arithmetic portion is, for example, a CPU (central processing unit). The storage portion includes storage media such as a ROM (read-only memory), a RAM (random-access memory), and an EEPROM (electrically erasable programmable read-only memory). The arithmetic portion performs various processes by reading and running a control program stored in the storage portion. Note that, the control portion 2 may be implemented with an integrated circuit alone, without software.

On the top face of the body housing 3, a display operation portion 19 (see FIG. 1) is provided. The display operation portion 19 has indicator lamps and push buttons. The control portion 2 lights the indicator lamps according to the status of the printer 1 and controls different parts of the printer 1 according to the operation on the push buttons.

The basic image forming operation of the printer 1 is as follows. When a print job is fed to the printer 1 from an external computer etc., the sheet feed roller 5 feeds out a sheet S from the sheet feed tray 4 to the conveyance passage 10; the registration roller 18 suspended from rotation corrects skewed feeding of the sheet S, and then feeds out the sheet S to the image forming device 6 with predetermined timing. In the image forming device 6, the charging device 12 electrostatically charges the photosensitive drum 11 to a predetermined potential, the exposure device 13 forms an electrostatic latent image on the photosensitive drum 11, the developing unit 14 forms a toner image by developing the electrostatic latent image with toner, and the transfer roller 15 transfers the toner image to the sheet S. Then, the fixing device 7, while nipping and conveying the sheet S, fuses the toner image to fix the toner image to the sheet S, and the discharge roller 8 discharges the sheet S to the discharge tray 9.

Figure 3:
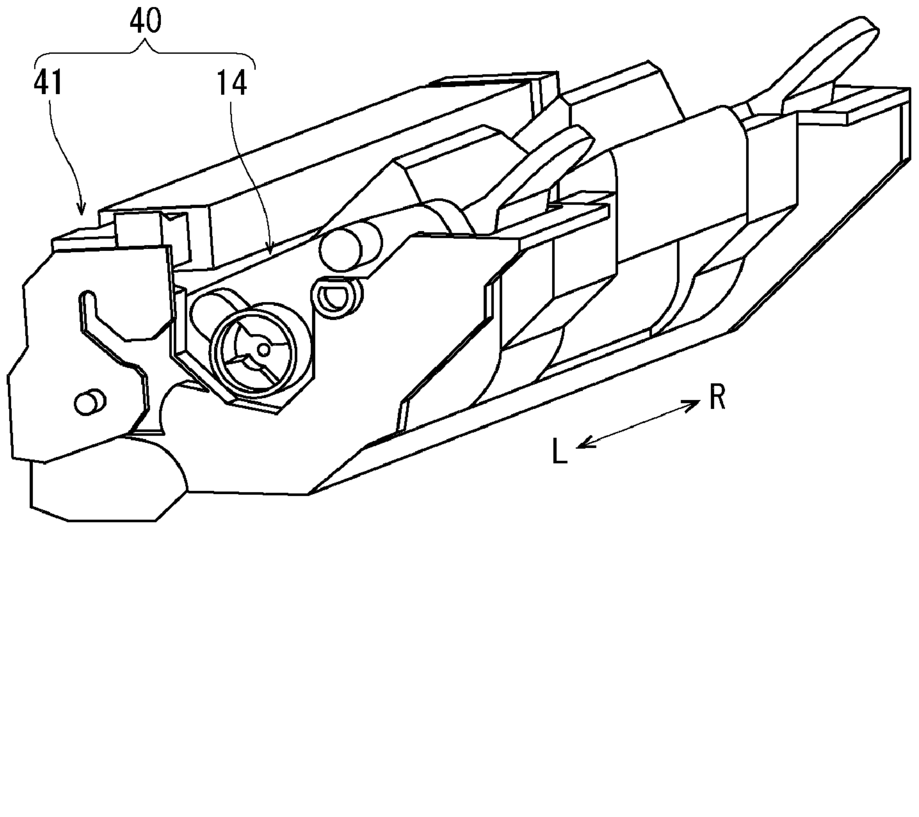
FIG. 3 is a perspective view of an image forming unit according to one embodiment of the present disclosure.
Figure 4:
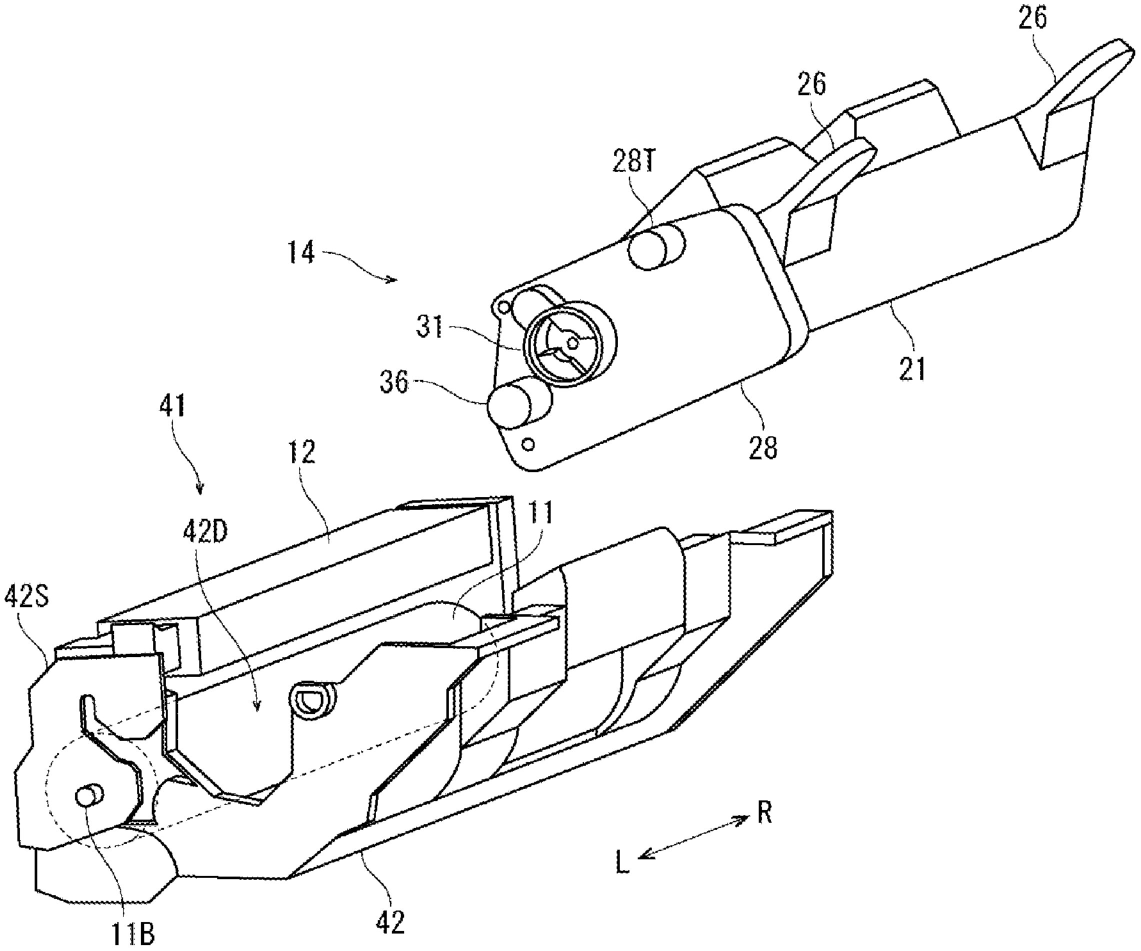
FIG. 4 is a perspective view of a developing unit and a drum unit according to one embodiment of the present disclosure.
Figure 5:
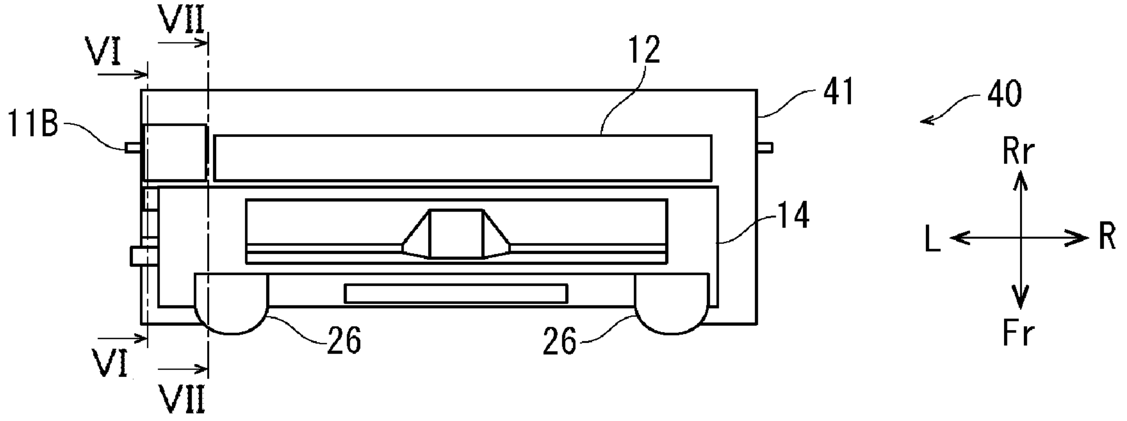
FIG. 5 is a plan view of the image forming unit according to one embodiment of the present disclosure.
Figure 6:
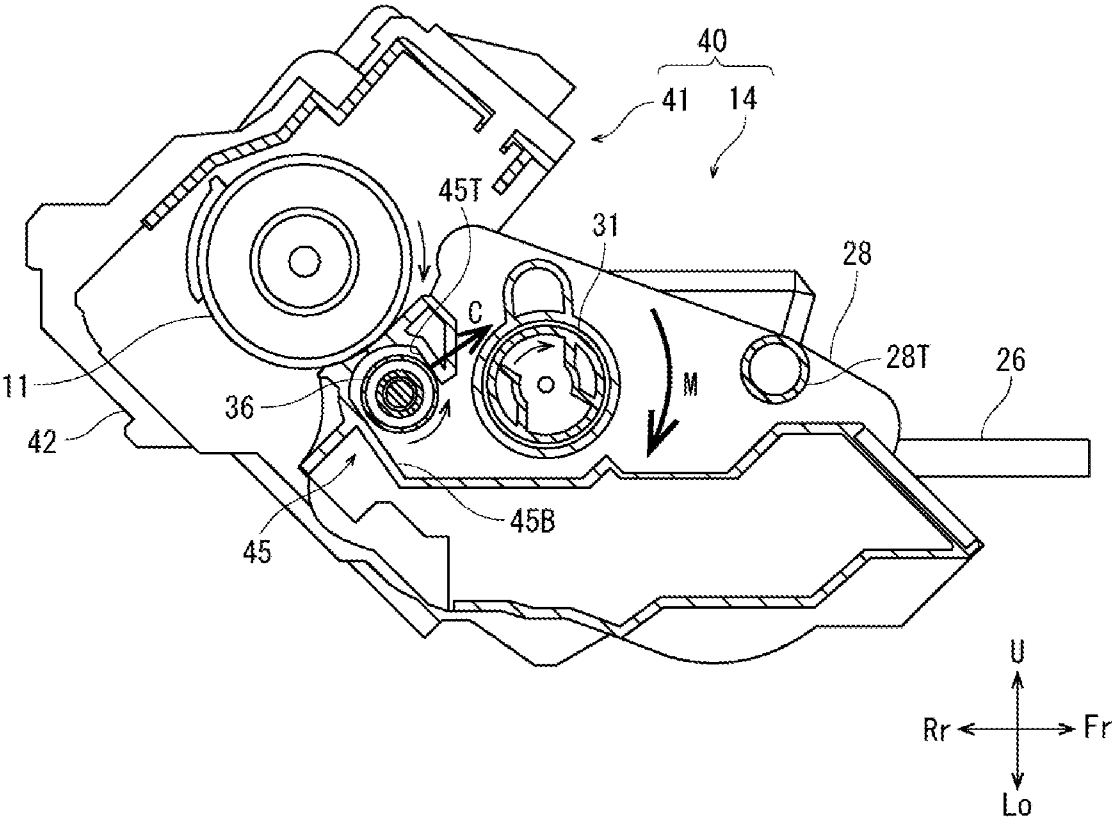
FIG. 6 is a sectional view along line VI-VI in FIG. 5.
Figure 7:
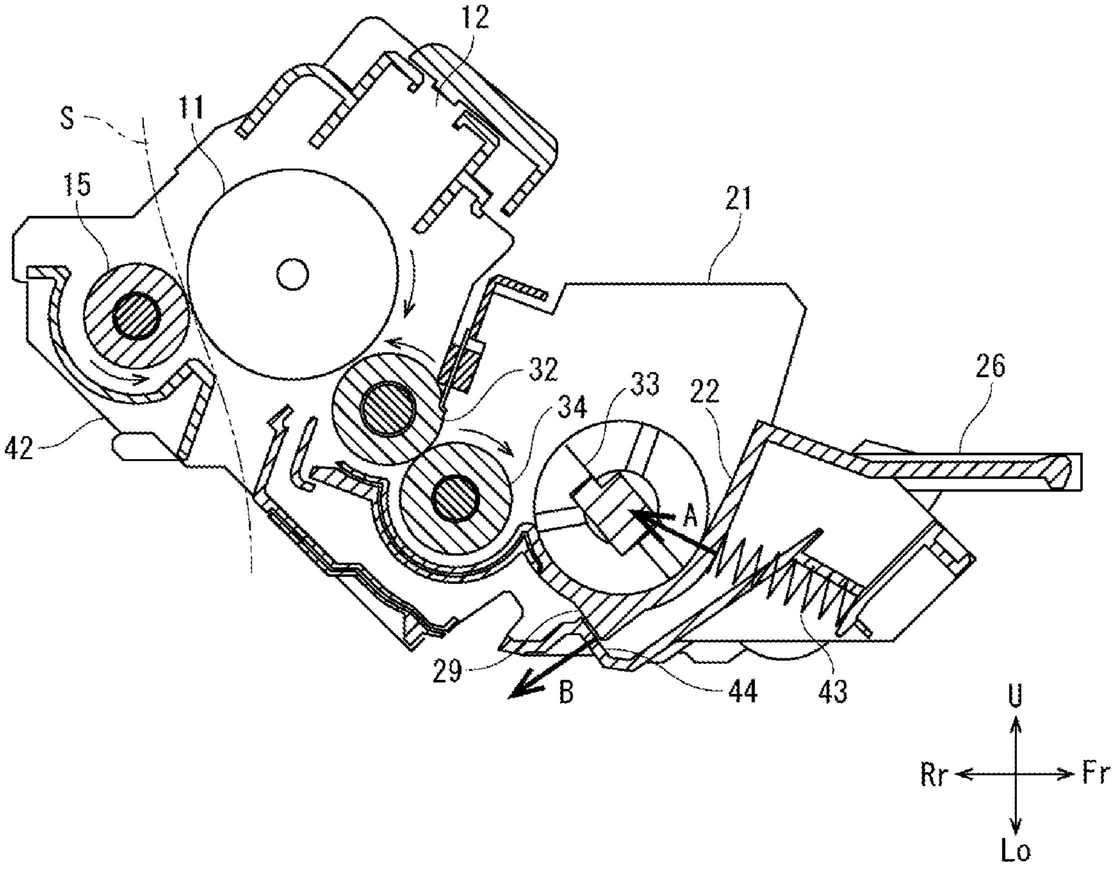
FIG. 7 is a sectional view along line VII-VII in FIG. 5.
Figure 8:
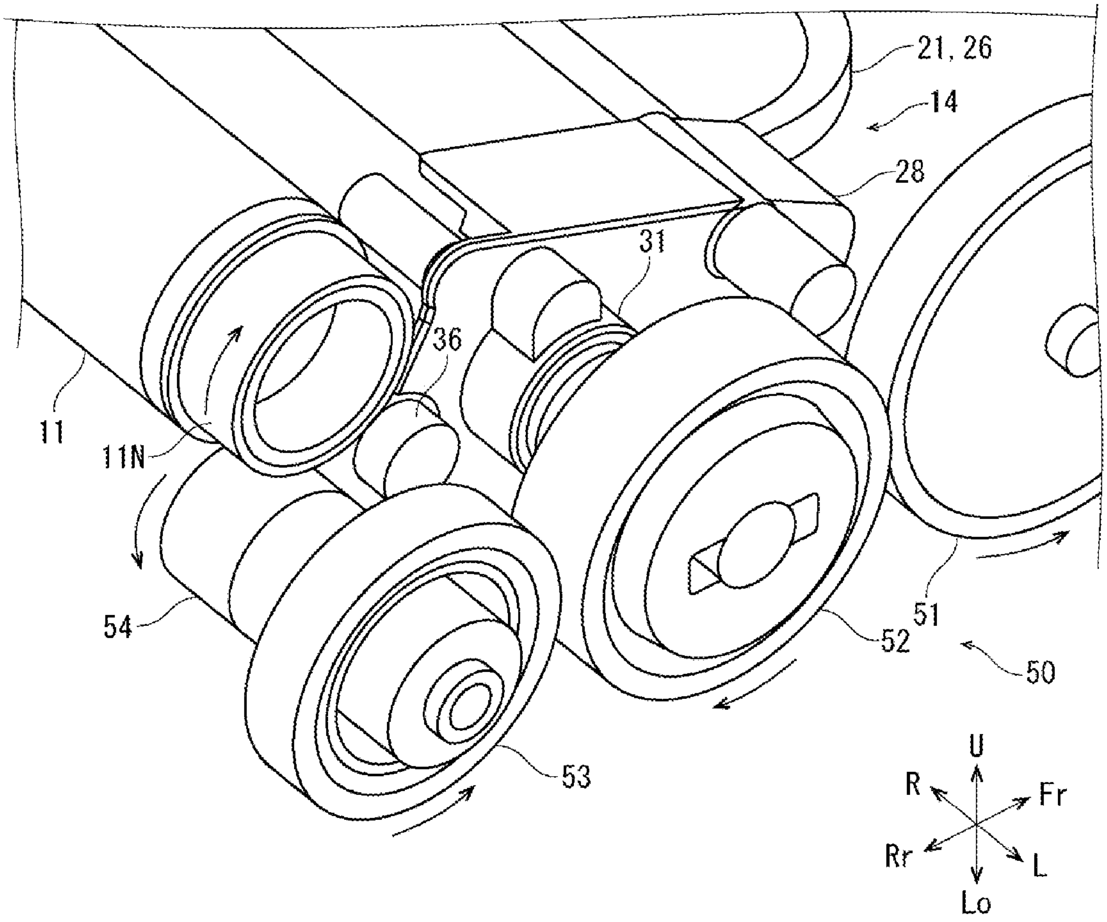
FIG. 8 is a perspective view showing the transmission of a driving force to a photosensitive drum according to one embodiment of the present disclosure.
Figure 9:
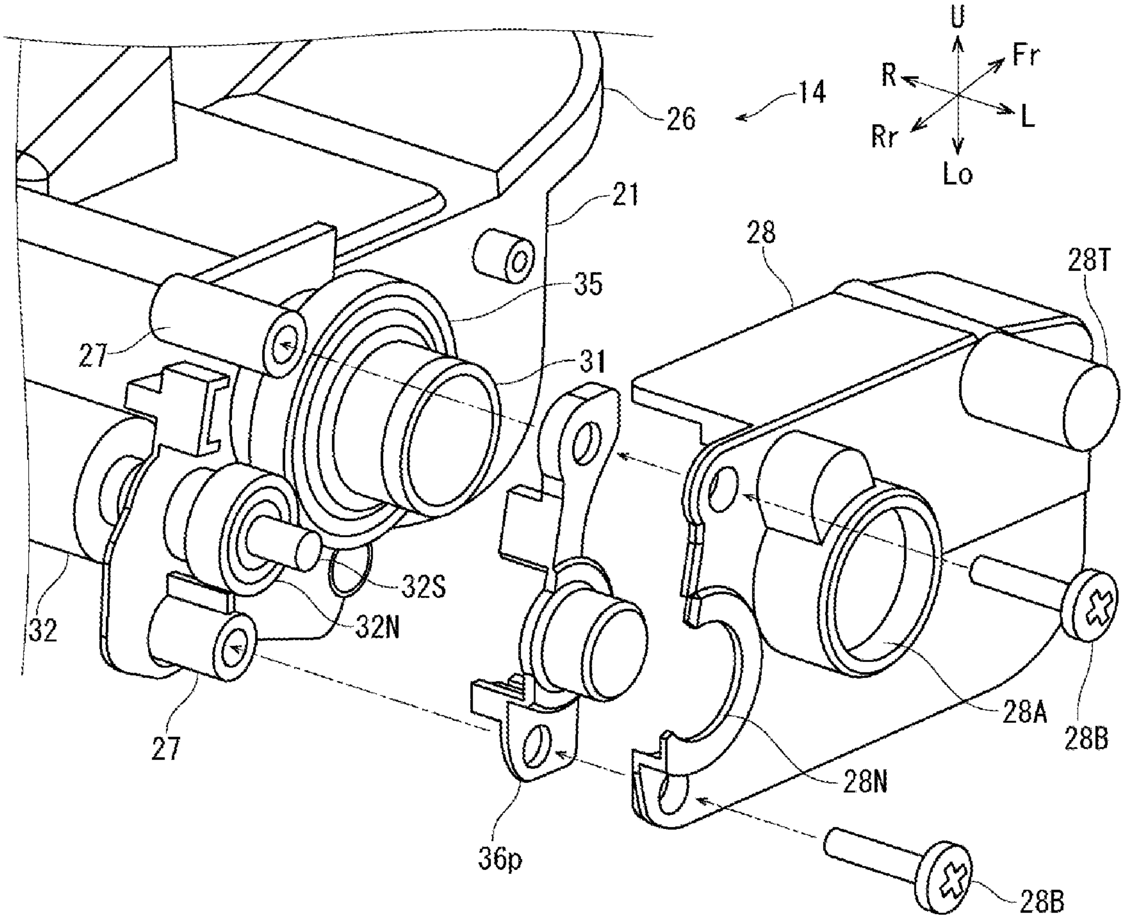
FIG.9 Related Art
FIG. 9 is a perspective view of a conventional developing roller bearing.
Figure 10:
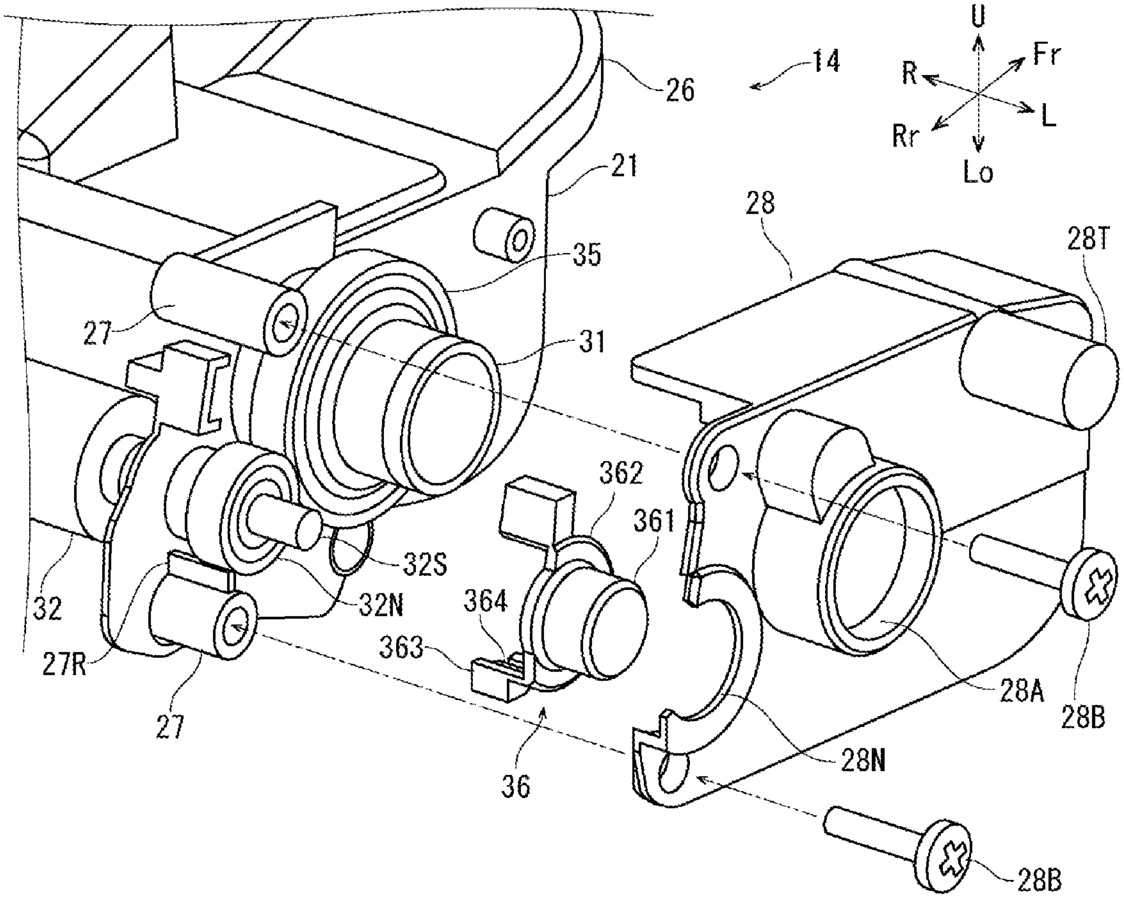
FIG. 10 is a perspective view showing a developing roller bearing according to one embodiment of the present disclosure.
Figure 11:
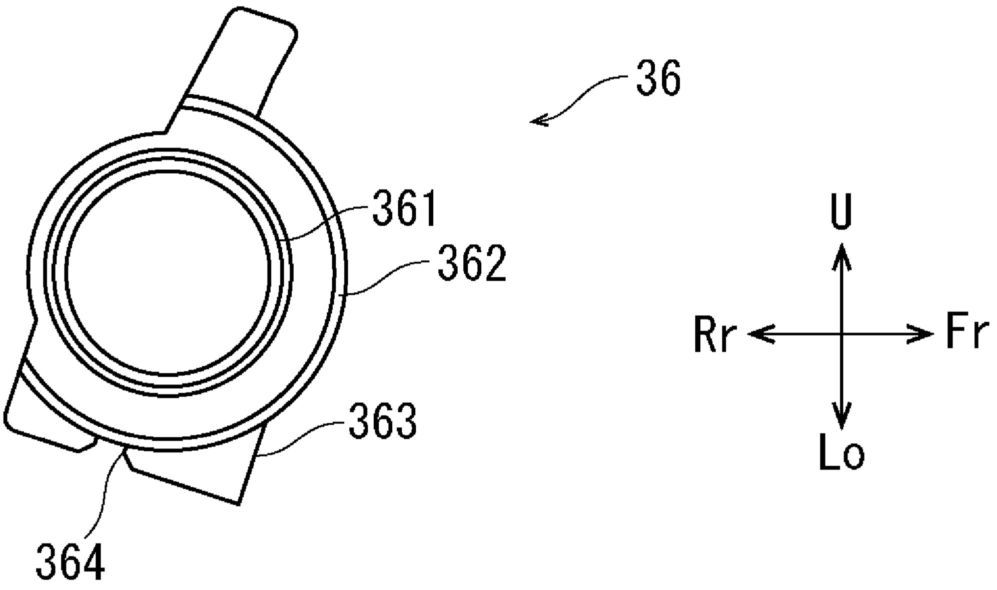
FIG. 11 is a left side view of the developing roller bearing according to one embodiment of the present disclosure.
Figure 12:
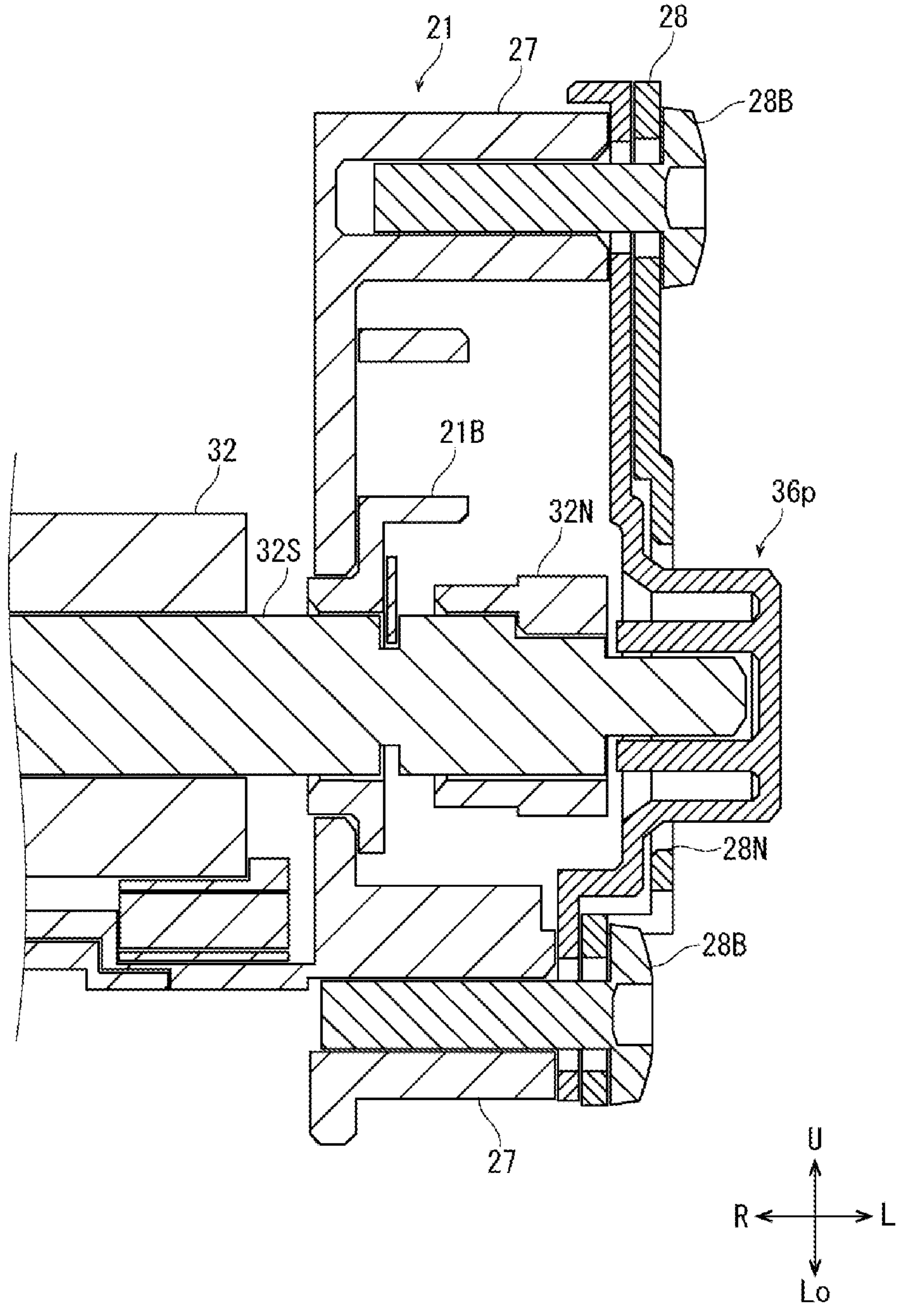
FIG.12 Related Art
FIG. 12 is a sectional view of the conventional developing roller bearing.
Figure 13:
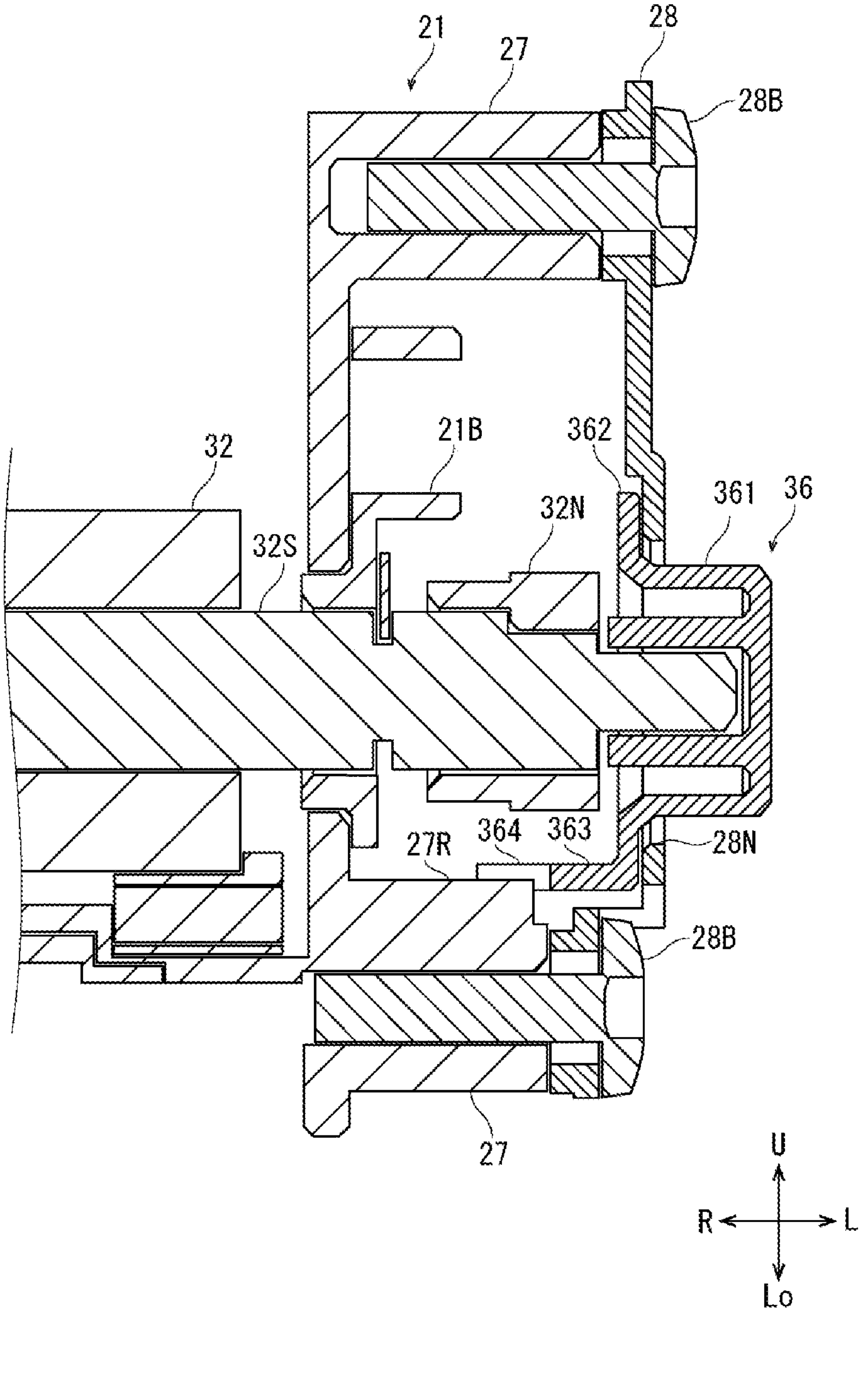
FIG. 13 is a sectional view of the developing roller bearing according to one embodiment of the present disclosure.
Figure 14:
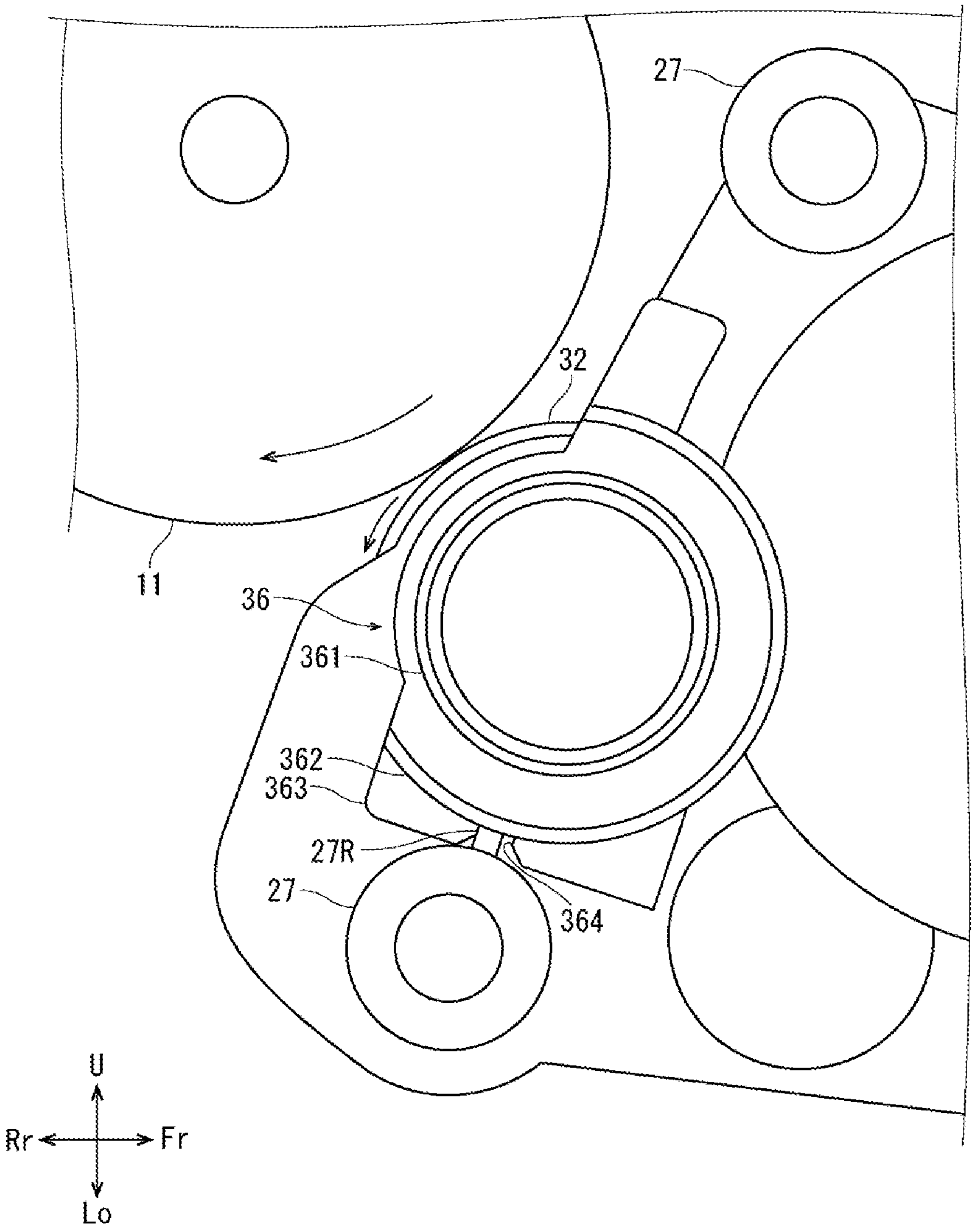
FIG. 14 is a left side view showing the operation of the developing roller bearing according to one embodiment of the present disclosure.

Next, a configuration of an image forming unit 40 will be described. FIG. 3 is a perspective view of the image forming unit 40. FIG. 4 is a perspective view of the developing unit 14 and a drum unit 41. FIG. 5 is a plan view of the image forming unit 40. FIG. 6 is a sectional view of the VI-VI section in FIG. 5. FIG. 7 is a sectional view of the VII-VII section in FIG. 5. FIG. 8 is a perspective view showing the transmission of a driving force to the photosensitive drum 11. FIG. 9 is a perspective view of a conventional developing roller bearing 36*p*. FIG. 10 is a perspective view showing a developing roller bearing 36 according to the embodiment. FIG. 11 is a left side view of the developing roller bearing 36 according to the embodiment. FIG. 12 is a sectional view of the conventional developing roller bearing 36*p*. FIG. 13 is a sectional view of the developing roller bearing 36 according to the embodiment. FIG. 14 is a left side view showing the operation of the developing roller bearing 36 according to the embodiment.

The printer 1 according to the embodiment includes a drum unit 41, the developing unit 14, a developing roller bearing 36, a guide portion 45, and an urging portion 43. The drum unit 41 includes the photosensitive drum 11. The developing unit 14 includes a developing roller 32. The developing roller bearing 36 supports the developing roller 32, and its radial displacement and axial rotation with respect to the developing unit 14 are permitted within predetermined ranges. The guide portion 45 is formed in the drum unit 41 and guides the developing roller bearing 36 in directions toward and away from the photosensitive drum 11. The urging portion 43 urges the developing unit 14 in such a direction that it presses the developing roller 32 against the photosensitive drum 11. The developing unit 14 includes a restriction portion 27R that restricts the rotation of the developing roller bearing 36 with respect to the developing unit 14 within a predetermined range. Specifically, it is configured as follows.

[Image Forming Unit]

The image forming unit 40 (see FIG. 3) includes the drum unit 41 and the developing unit 14. The drum unit 41 is removably attachable to the body housing 3. The developing unit 14 is removably attachable to the drum unit 41 (see FIG. 4).

[Drum Unit]

The drum unit 41 includes a drum housing 42 in the shape of a box of which the longitudinal direction runs in the left-right direction. The drum housing 42 accommodates the photosensitive drum 11, the charging device 12, and the transfer roller 15 (see FIG. 7). A drum bearing 11B that supports the shaft of the photosensitive drum 11 projects from each of left and right side wall portions 42S of the drum housing 42 (see FIG. 4). The charging device 12 is provided above the photosensitive drum 11. In front of the photosensitive drum 11 in the drum housing 42, a developing unit accommodation portion 42D for accommodating the developing unit 14 is provided. The developing unit accommodation portion 42D is in a recessed shape open at the top. The drum unit 41 includes the urging portion 43 that urges the developing unit 14 in such a direction that it presses the developing roller 32 against the photosensitive drum 11

(direction A in FIG. 7). The urging portion 43 includes, for example, a compression coil spring.

[Developing Unit]

The developing unit 14 includes a developing housing 21 in the shape of a box of which the longitudinal direction runs in the left-right direction. Grip portions 26 project forward from left and right end parts of the developing housing 21. The developing housing 21 is provided with a stirring chamber 22 (see FIG. 7) which is a space elongate in the left-right direction. The stirring chamber 22 is provided with a paddle 33 having an axis along the left-right direction. The paddle 33 stirs the developer loaded in the stirring chamber 22. The developer is a non-magnetic one-component developer.

Behind the stirring chamber 22, a feeding roller 34 is provided. Behind the feeding roller 34, obliquely above it, the developing roller 32 is provided. The feeding roller 34 is arranged in contact with the surface of the developing roller 32. The developer stirred in the stirring chamber 22 is fed to the developing roller 32 by the feeding roller 34. In a part of the developing housing 21 facing the photosensitive drum 11, an opening 24 (see FIG. 2) is provided. Over the entire range of the developing roller 32 along its axial direction, part of the outer circumferential surface of the developing roller 32 is exposed through the opening 24. The developing roller 32 is rotatably supported by a bearing member 21B (see FIG. 13) fastened to the developing housing 21. While the bearing member 21B shown in FIG. 13 is a sleeve bearing, a ball bearing or the like can also be used instead. Between the inner circumferential surface of the bearing member 21B and the outer circumferential surface of a rotation shaft 32S of the developing roller 32, a clearance of several tens of micrometers is provided for smooth rotation. Outside the bearing member 21B, the developing roller bearing 36 that supports the shaft of the developing roller 32 projects from each of a left and a right developing cover 28 of the developing housing 21 (see FIGS. 4, 8, 10, and 13).

[Coupling]

The body housing 3 is provided with a motor (not illustrated) and a reduction gear train 50 (see FIG. 8). The reduction gear train 50 transmits a driving force to a driven gear 11N provided on the photosensitive drum 11. On a left end part of the developing housing 21, a coupling 31 (see FIGS. 4, 6, 8, and 10) is provided. The coupling 31 is connected to an idler gear 52 (see FIG. 8) included in the reduction gear train 50. The idler gear 52 includes a coupling member that is connected to a top plate 3T with a link mechanism and a cam mechanism and that slides in the axial direction (the link mechanism, the cam mechanism, and the coupling member are not illustrated). As the top plate 3T is opened, the coupling member retracts leftward so that the idler gear 52 is disconnected from the coupling 31; as the top plate 3T is closed, the coupling member advances rightward so that the idler gear 52 is connected to the coupling 31. Inside the developing housing 21, an idler gear 35 (see FIG. 10) which is coaxial with the coupling 31 is provided. The idler gear 35 transmits a driving force to a driven gear 32N provided on the developing roller 32. (The teeth of none of the idler gears 35 and 52 and the driven gear 32N are illustrated.)

[Developing Roller Bearing]

A left end part of the rotation shaft 32S of the developing roller 32 is provided with the developing roller bearing 36 (see FIGS. 10, 11, and 13). The developing roller bearing 36 includes a main portion 361 in the shape of a cylinder, a flange portion 362, and an extension portion 363 extending rightward from a part of the flange portion 362 in the circumferential direction. The main portion 361 is closed at its left end in the axial direction and is open at its right end. A left end part of the rotation axis 32S of the developing roller 32 is inserted in the main portion 361. The flange portion 362 is provided on a right edge part of the main portion 361. In the extension portion 363, a cut portion 364 cut in the radial direction is provided. The cut portion 364 is, for example, a slit penetrating in the radial direction.

[Developing Cover]

The left end face of the developing housing 21 is covered with the developing cover 28 (see FIG. 10). The developing cover 28 is provided with a cut portion 28N in the shape of an arc in which the developing roller bearing 36 is inserted, and an opening portion 28A in a circular shape in which the coupling 31 is inserted. The developing roller bearing 36 is exposed leftward through the cut portion 28N. The diameter of the cut portion 28N is slightly larger than the outer diameter of the developing roller bearing 36 and a gap is formed between the developing roller bearing 36 and the cut portion 28N. The developing cover 28 has a guide projection 28T (see FIGS. 4, 6, and 10) formed on it upstream of the developing roller bearing 36 in the direction in which it is attached to the drum housing 42. The developing guide projection 28T is a projection in the shape of a cylinder with an outer diameter approximately equal to that of the developing roller bearing 36.

The embodiment compares with the conventional configuration as follows. The conventional developing roller bearing 36*p* (see FIGS. 9 and 12) is fastened together with the developing cover 28 to the developing housing 21 with bolts 28B. In other words, the developing roller bearing 36*p* is not permitted to move in the radial direction or rotate about its axis with respect to the developing housing 21 and the developing cover 28. In contrast, the developing roller bearing 36 of this embodiment (see FIGS. 10 and 13) is not fastened to either the developing housing 21 or the developing cover 28. That is, the developing roller bearing 36 is permitted to move in the radial direction and rotate about its axis with respect to the developing housing 21 and the developing cover 28 within the gap between the developing roller bearing 36 and the cut portion 28N.

[Guide Portion]

Inside the drum housing 42, the guide portion 45 for guiding the developing roller bearing 36 in the directions toward and away from the photosensitive drum 11 (see FIG. 6) is provided. The guide portion 45 includes a lower guide portion 45B located below the developing roller bearing 36 and an upper guide portion 45T located above the developing roller bearing 36. In the embodiment, the developing roller 32 is arranged in front of the photosensitive drum 11, obliquely below it, and thus the lower and upper guide portions 45B and 45T are tilted so that their rear parts are located higher than their front parts.

[Restriction Portion]

The developing cover 28 is fastened to the developing housing 21 with bolts 28B (see FIGS. 10 and 13). The left end face of the developing housing 21 is provided with bosses 27 projecting leftward below and above the developing roller 32. The bosses 27 have bolt holes for fastening the bolts 28B. In an upper part of the lower boss 27, the restriction portion 27R is provided. The restriction portion 27R is, for example, a projection projecting upward, elongate in the left-right direction. The restriction portion 27R is arranged inside the cut portion 364 in the developing roller bearing 36. The width of the cut portion 364 in the circumferential direction is larger than the width of the restriction portion 27R in the circumferential direction. In other words, a gap is provided between the cut portion 364 and the restriction portion 27R in the circumferential direction. The rotation of the developing roller bearing 36 is restricted within this gap. The width of the gap is set to be equal to or greater than the radial displacement of the contact region of the photosensitive drum 11 with the developing roller 32 ascribable to the clearance between the bearing member 21B in the developing housing 21 and the rotation shaft 32S of the developing roller 32.

Here, the attachment of the developing unit 14 to the drum housing 42 attached to the body housing 3 will now be described. First, the top plate 3T of the body housing 3 is moved to and held in the open position. Meanwhile, as the top plate 3T is opened, the coupling member of the idler gear 52 moves outside the developing unit accommodation portion 42D. Next, the developing unit 14 is inserted through the opening, which has been closed with the top plate 3T, into the body housing 3. The body housing 3 has a drum guide groove 3GA (see FIG. 2) formed in it for attaching and positioning the drum unit 41 through the opening, which has been closed by the top plate 3T. The body housing 3 also has a developing guide groove 3GB (see FIG. 2) formed in it that extends from the opening, which has been closed by the top plate 3T, to the guide portion 45 of the drum housing 42 to connect to it.

The developing unit 14 is attached through the opening of the body housing 3 with the drum unit 41 attached on the body housing 3. Specifically, the developing roller bearing 36 and the developing guide projection 28T are inserted in this order into the developing guide groove 3GB, and are moved toward the drum unit 41 while keeping their positions with the developing guide groove 3GB. The developing roller bearing 36 passes through the developing guide groove 3GB, moves to the guide portion 45 in the drum unit 41 to be positioned there. The developing guide projection 28T is located in the developing guide groove 3GB.

A rotation stopper 29 (see FIG. 7) is formed in a lower part of the developing housing 21, at the side away from the developing roller 32, and a receiving portion 44 that makes contact with the rotation stopper 29 is formed in the drum housing 42. The developing unit 14 attached to the drum unit 41 is restricted from rotating around the coupling 31 by the engagement between the developing roller bearing 36 and the guide portion 45 and the contact between the rotation stopper 29 and the receiving portion 44. The developing unit 14 is urged by the urging portion 43 in such a direction that it presses the developing roller 32 against the photosensitive drum 11 (direction A in FIG. 7). The strength of the urging force of the urging portion 43 is set, with consideration given to the weight of the developing unit 14 and the like, such that the nip pressure of the developing roller 32 against the photosensitive drum 11 is within a range in which appropriate image formation is possible. The weight of the developing unit 14 decreases as the developer stored in it is consumed; considering however that the drop in weight is 10% or less, its effect on the nip pressure of the developing roller 32 against the photosensitive drum 11 is limited and tolerable.

Next, the operation of the above configuration will be described. The driving force is transmitted to the photosensitive drum 11 via an idler gear 51, the idler gear 52, an idler gear 53, an idler gear 54, and the driven gear 11N in this order (see FIG. 8). The driving force is transmitted to the developing roller 32 via the idler gear 51, the idler gear 52, the coupling 31 (see FIG. 10), the idler gear 35 (see FIG. 10), and the driven gear 32N in this order (see FIG. 10). (The teeth of none of the idler gears 51 to 54 and the driven gears 11N and 32N are illustrated.)

Play is left between the idler gear 52 and the coupling 31, so that the developing roller 32 starts rotating later than the photosensitive drum 11. The photosensitive drum 11 rotates clockwise (see FIGS. 6, 7, and 14). The developing roller 32 is in contact with the photosensitive drum 11, so during the period from the start of rotation of the photosensitive drum 11 until the start of rotation of the developing roller 32, the photosensitive drum 11 exerts a clockwise (downward) frictional force on the developing roller 32. Then, owing to play left between the lower and upper guide portions 45B and 45T (see FIG. 6) and the developing roller bearing 36, the developing roller bearing 36 is pressed against the lower guide portion 45B. Meanwhile, the developing roller bearing 36 rotates counterclockwise so as to follow the rotation shaft 32S of the developing roller 32, and the cut portion 364 in the developing roller bearing 36 moves with respect to the restriction portion 27R, forming a gap in front of the restriction portion 27R (see FIG. 14).

Next, when the idler gear 52 and the coupling 31 mesh with each other, together with the idler gear 52, the coupling 31 starts to rotate clockwise, and the developing roller 32 starts to rotate counterclockwise. At the same time, the feeding roller 34 and the paddle 33, which are drivingly coupled with the coupling 31, start to rotate. The clockwise rotation of the coupling 31 causes a rotation moment M to act on the developing unit 14 in the clockwise direction (see FIG. 6). The rotation moment M presses the rotation stopper 29 against the receiving portion 44 of the drum housing 42 (direction B in FIG. 7). Also the developing roller 32 starts rotating counterclockwise. To stably feed the developer, the surface speed of the developing roller 32 is set to a speed higher than that of the photosensitive drum 11. Thus, when the developing roller 32 starts to rotate counterclockwise, the photosensitive drum 11 exerts a clockwise (upward) frictional force on the developing roller 32, and the developing roller bearing 36 makes contact with the upper guide portion 45T (direction C in FIG. 6). The contact between the rotation stopper 29 and the receiving portion 44 and the contact between the developing roller bearing 36 and the upper guide portion 45T restrict the clockwise rotation of the developing unit 14.

Here, the radial displacement of the circumferential surface of the photosensitive drum 11 may be close to 100 μm at the maximum. If the radial variation of the circumferential surface of the photosensitive drum 11 is 100 μm, unless the developing roller 32 moves so as to follow the surface position of the photosensitive drum 11, a nip amount between the photosensitive drum 11 and the developing roller 32 may be excessive or insufficient, possibly leading to a defective image. Specifically, if the nip amount is insufficient, the developer will not sufficiently adhere to the photosensitive drum 11; if the nip is excessive, even if the developer adheres to the photosensitive drum 11, it is taken off by the developing roller 32. To prevent this, it is necessary to reduce the variation of the nip state between the photosensitive drum 11 and the developing roller 32 by moving the developing unit 14 according to the radial variation of the circumferential surface of the photosensitive drum 11 so as to make the developing roller 32 follow the radial variation of the circumferential surface of the photosensitive drum 11.

However, it has turned out that moving the developing unit 14 according to the radial variation of the circumferential surface of the photosensitive drum 11 has the following problem. With the rotation moment M acting, the frictional force between the rotation stopper 29 and the receiving portion 44, and hence the resistance to move the developing unit 14, is so high that it is difficult to eliminate the variation of the nip state by moving the developing unit 14 according to the radial variation of the contact region between the photosensitive drum 11 and the developing roller 32 so as to make the developing roller 32 follow the photosensitive drum 11.

On the other hand, as described above, a clearance is provided between the developing roller 32 and the bearing member 21B provided in the developing housing 21. The developing roller 32 forms a nip with the feeding roller 34. When the developing unit 14 is attached to the drum unit 41, the developing roller 32 is pressed by the urging force of the urging portion 43 against the photosensitive drum 11 until a predetermined nip pressure is reached. Meanwhile, as it has been found out, the developing roller 32 receives a reaction force from the photosensitive drum 11 and a reaction force from the feeding roller 34, and under the balance of the two reaction forces, the rotation shaft 32S moves over the distance of the clearance with respect to the bearing member 21B. That is, assuming that, during the image forming operation, the developing unit 14 does not move from the position where it is when attached to the drum unit 41, if the radial variation of the circumferential surface occurs as the photosensitive drum 11 rotates, the developing roller 32 can follow the photosensitive drum 11 over the distance of the clearance between the rotation shaft 32S and the bearing member 21B.

Figure 15:
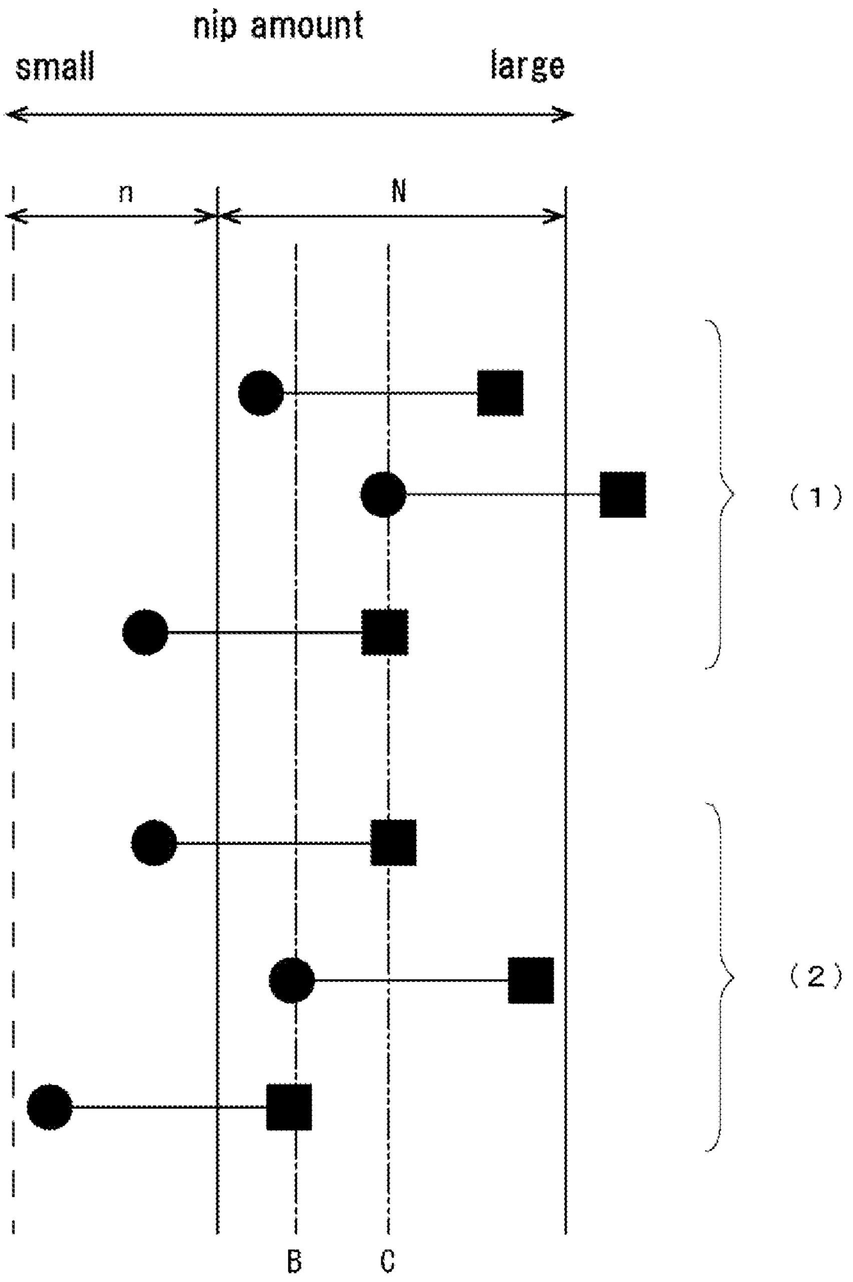
FIG. 15 is a schematic diagram illustrating the variation of the nip amount between the photosensitive drum and the developing roller in the image forming unit according to one embodiment of the present disclosure.

FIG. 15 is a schematic diagram illustrating the variation of the nip amount between the photosensitive drum 11 and the developing roller 32 in the image forming unit according to one embodiment of the present disclosure. Range N is the range of the nip amount between the photosensitive drum 11 and the developing roller 32 in which no defective image is produced. Range n is the range in which no defective image is produced, this range being expanded from the range N as a result of the developing roller 32 following the photosensitive drum 11 owing to the clearance between the developing roller 32 and the bearing member 21B. A nip variation range indicated by a black circle and a black square connected with a solid line is the range of the variation of the nip amount due to the radial variation of the circumferential surface that occurs as the photosensitive drum 11 rotates, if the developing roller 32 does not move with respect to the photosensitive drum 11. The black circle indicates the state in which the circumferential surface of the photosensitive drum 11 has moved to the farthest position from the developing roller 32; the black square indicates the state in which the circumferential surface of the photosensitive drum 11 has moved to the nearest position from the developing roller 32. A dash-dot-dot line indicates the median value C of the range N. A dash-and-dot line indicates the reference set value B of the nip amount according to the present disclosure.

In one embodiment of the present disclosure shown in FIG. 15, when the developing unit 14 is attached to the drum unit 41, it is assumed that the rotation shaft 32S has moved to the farthest position from the photosensitive drum 11 with respect to the bearing member 21B under the reaction force at the nip between the photosensitive drum 11 and the developing roller 32 and the reaction force at the nip between the developing roller 32 and the feeding roller 34. Group (1) shows the variation of the nip amount between the photosensitive drum 11 and the developing roller 32 with the conventional developing roller bearing 36*p* shown in FIG. 12. Group (2) shows the variation of the nip amount between the photosensitive drum 11 and the developing roller 32 with the developing roller bearing 36 according to one embodiment of the present disclosure shown in FIG. 13. When the developing unit 14 is attached to the drum unit 41, the phase of the radial variation of the circumferential surface of the photosensitive drum 11 cannot be identified. Within each group, the nip variation range in the upper tier shows a case where the middle position of the radial variation of the photosensitive drum 11 faces the developing roller 32. The one in the middle tier shows a case where the farthest position of the radial variation of the photosensitive drum 11 faces the developing roller 32. The one in the lower tier shows a case where the nearest position of the radial variation of the photosensitive drum 11 faces the developing roller 32.

With the conventional developing roller bearing 36*p* shown in group (1), the developing roller bearing 36*p* is fastened to the developing unit 14, so it is difficult for the rotation shaft 32S of the developing roller 32 to move over the clearance of the bearing member 21B. Thus, unless the developing unit 14 can move, the developing roller 32 cannot follow the radial variation of the circumferential surface of the photosensitive drum 11. As a result, when the developing unit 14 is attached to the drum unit 41, depending on the phase of the radial variation of the circumferential surface of the photosensitive drum 11, as in the cases shown in the middle and lower tiers, the nip amount between the photosensitive drum 11 and the developing roller 32 may be excessive or insufficient, possibly leading to a defective image.

With the developing roller bearing 36 according to one embodiment of the present disclosure shown in group (2), the width of the gap between the cut portion 364 and the restriction portion 27R in the developing roller bearing 36 is equal to or greater than the radial displacement of the contact region of the photosensitive drum 11 with the developing roller 32. Thus, when the developing roller 32 moves toward the photosensitive drum 11, the developing roller 32 can follow the radial displacement of the contact region of the photosensitive drum 11 with the developing roller 32 and move owing to the clearance between the rotation shaft 32S of the developing roller 32 and the bearing member 21B in the developing housing 21. It is thus possible to suppress the variation of the nip amount between the photosensitive drum 11 and the developing roller 32.

Thus, as shown in FIG. 15, in one embodiment of the present disclosure, with consideration given to the developing roller 32 following the photosensitive drum 11, the urging force of the urging portion 43 and the like are set so that the reference set value B of the nip amount between the photosensitive drum 11 and the developing unit 14 with the developing unit 14 attached to the drum unit 41 is a predetermined amount smaller than the median value C in the range N of the nip amount in which no defective image is produced in the conventional configuration. In this way, in any of the cases shown in the upper, middle, and lower tiers, regardless of the phase of the radial variation of the circumferential surface of the photosensitive drum 11 when the developing unit 14 is attached to the drum unit 41, the radial variation range of the circumferential surface of the photosensitive drum 11 can always be kept in a range of the nip amount in which no defective image is produced.

As described above, the printer 1 according to the embodiment includes a drum unit 41 having a photosensitive drum 11, the developing unit 14 having a developing roller 32, a developing roller bearing 36 that supports the developing roller 32 and that can move radially and rotate axially with respect to the developing unit 14, a guide portion 45 formed in the drum unit 41 to guide the developing roller bearing 36 in directions toward and away from the photosensitive drum 11, an urging portion 43 that urges the developing unit 14 in such a direction that it presses the developing roller 32 against the photosensitive drum 11. The developing unit 14 has a restriction portion 27R that restricts the rotation of the developing roller bearing 36 with respect to the developing unit 14 within a predetermined range. With this configuration, the developing roller 32 follows the radial displacement of the contact region of the photosensitive drum 11 with the developing roller 32 and moves, so it is possible to suppress variation of the pressing force between the photosensitive drum 11 and the developing roller 32 without increasing the number of components.

With the printer 1 according to the embodiment, the predetermined range may be equal to or greater than the radial displacement of the contact region of the photosensitive drum 11 with the developing roller 32. With this configuration, the developing roller 32 can always follow the radial displacement of the contact region of the photosensitive drum 11 with the developing roller 32 and move.

With the printer 1 according to the embodiment, the developing roller bearing 36 may have a cut portion 364 cut in the radial direction, and the restriction portion 27R may be arranged inside the cut portion 364. The gap between the cut portion 364 and the restriction portion 27R may be equal to or greater than the radial displacement of the contact region. With this configuration, the displacement of the developing roller bearing 36 can be restricted with a simple configuration.

The printer 1 according to the embodiment may include a coupling 31 that transmits a driving force to the developing roller 32. With this configuration, during the period from the start of rotation of the photosensitive drum 11 until the start of rotation of the developing roller 32, a clearance of a predetermined range is secured in the movement of the developing roller 32 toward the photosensitive drum 11. It is thus possible to suppress the variation of the pressing force between the photosensitive drum 11 and the developing roller 32.

The nip amount can denote, for example, the nip width, or the difference between the sum of the radii of the photosensitive drum 11 and the developing roller 32 and the distance between the axes of the photosensitive drum 11 and the developing roller 32. Or the nip pressure can be taken as the nip amount. The above embodiment may be modified as follows.

The restriction portion 27R may have a different configuration from that in the above embodiment. For example, the restriction portion 27R may be configured to hold the main portion 361 of the developing roller bearing 36 from opposite sides in the front-rear direction and a gap may be provided between the restriction portion 27R and the main portion 361.

What is claimed is:

1. An image forming apparatus comprising:
- a drum unit including a photosensitive drum;
- a developing unit including a developing roller;
- a developing roller bearing that supports the developing roller and that can move radially and rotate axially with respect to the developing unit;
- a guide portion formed in the drum unit to guide the developing roller bearing in directions toward and away from the photosensitive drum; and
- an urging portion that urges the developing unit in such a direction that the developing unit presses the developing roller against the photosensitive drum, wherein
- the developing unit has a restriction portion that restricts rotation of the developing roller bearing with respect to the developing unit within a predetermined range.

2. The image forming apparatus according to claim 1, wherein
- the predetermined range is equal to or greater than a radial displacement of a contact region of the photosensitive drum with the developing roller.

3. The image forming apparatus according to claim 2, wherein
- the developing roller bearing has a cut portion cut in a radial direction,
- the restriction portion is arranged inside the cut portion, and
- a gap between the cut portion and the restriction portion is equal to or greater than the radial displacement of the contact region.

4. The image forming apparatus according to claim 3, further comprising:
- a coupling that transmits a driving force to the developing roller.

5. The image forming apparatus according to claim 2, further comprising:
- a coupling that transmits a driving force to the developing roller.

6. The image forming apparatus according to claim 1, further comprising:
- a coupling that transmits a driving force to the developing roller.

* * * * *